M. L. KEAGY.
TIRE.
APPLICATION FILED AUG. 2, 1911.

1,055,472.

Patented Mar. 11, 1913.

Witnesses
T. J. Austin
W. M. Hart

Inventor
Martin L. Keagy
By Joshua R. H. Potts
Attorney

UNITED STATES PATENT OFFICE.

MARTIN L. KEAGY, OF CANTON, OHIO.

TIRE.

1,055,472.  Specification of Letters Patent.   Patented Mar. 11, 1913.

Application filed August 2, 1911. Serial No. 641,907.

*To all whom it may concern:*

Be it known that I, MARTIN L. KEAGY, a citizen of the United States, residing at Canton, county of Stark, and State of Ohio, have invented certain new and useful Improvements in Tires, of which the following is a specification.

My invention relates to tires and particularly to pneumatic tires for bicycles, automobiles or other vehicles.

The object of my invention is to provide a tire which shall be, in a large measure, proof against puncture, and which if punctured, may still be maintained in use without injury to the tire or the wheel rim.

A further object of my invention is to provide a device as mentioned which may be supplied to the trade either as a complete tire or as a core to take the place of the usual inner tube in a tire of any ordinary or preferred form.

Other objects will appear hereinafter.

With these objects in view my invention consists generally in a body portion of a tire or core for an outer tube, said body or core being provided with a plurality of circumferential cells each adapted to contain an inflatable tube and so constructed that the inner or inflatable tubes may be readily inserted or removed and independently inflated.

My invention further consists in certain reinforcements for the body or core to prevent collapsing or distortion of the tire should one of the inflatable tubes be punctured.

My invention further consists in various details of construction and arrangements of parts all as will be fully described hereinafter and particularly pointed out in the claim.

My invention will be more readily understood by reference to the accompanying drawings forming a part of this specification and in which—

Figure 1:
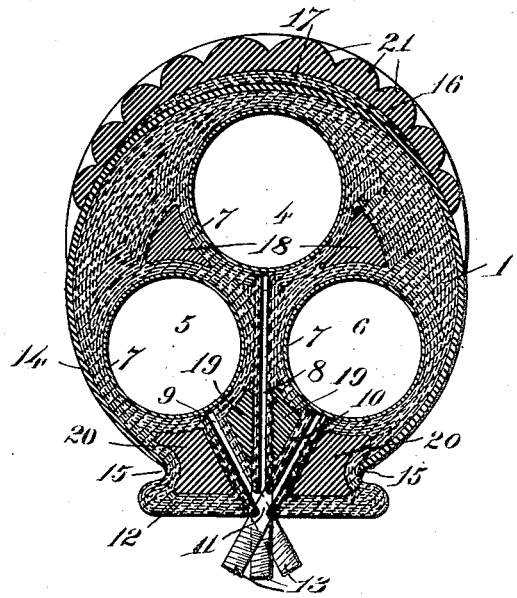
Figure 2:
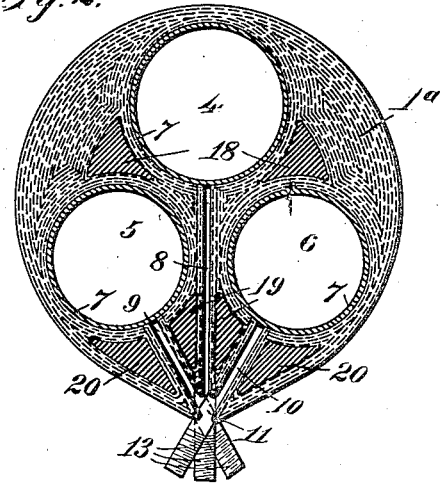

Figure 1 is a transverse section through a tire embodying my invention in its preferred form. Fig. 2 is a similar view of a core embodying my invention and adapted to be inserted within the outer tube of an ordinary tire, and Fig. 3 is a detail view looking at the inner or rim engaging face and illustrating the position of the inflating nipples.

Figure 3:
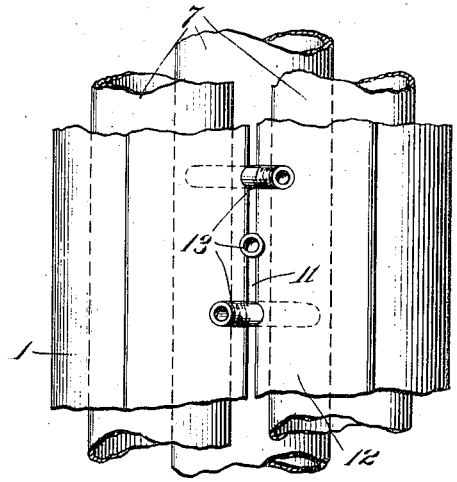

Referring now to Figs. 1 and 3 of the drawings, 1 indicates the body of the tire which may be of any desired form but which I have illustrated of the usual shape to be arranged upon an ordinary clencher rim. The body 1 is formed generally of alternate layers of friction cloth, such as canvas or duck, and sheets of rubber, 2 and 3 respectively, vulcanized together. The body 1 is formed with a plurality, preferably three, circumferentially extending cells 4, 5 and 6, which are preferably circular in cross section, and which are adapted to receive inflatable tubes 7. The body is also formed with circumferential slots 8, 9 and 10 which extend to the cells 4, 5 and 6 respectively and through which the tubes 7 may be inserted or removed. The several slots preferably converge to a single slot 11 disposed centrally of the base 12 of the tire. When the tire is removed from the rim it may be readily opened at the several slots to insert or remove the tube 7.

13 indicates the inflating nipples for the several tubes 7 which are preferably arranged near together as illustrated in Fig. 3 to facilitate inflating the tire.

The body 1 is covered with a layer of rubber 14 extending about the body from one groove 15 to the other, which grooves receive the edges of the clencher rim. 16 indicates the tread which is formed of rubber, thick at the center and tapering toward the edges and extending substantially half way around the body of the tire. The portions 14 and 16 are vulcanized to the body 1, or rather the layer 14 is vulcanized to the body and the tread 16 to the layer 14. Interposed between the layer 14 and tread 16 are preferably interposed several alternate layers of friction cloth 2 and rubber 3 forming a filler 17 which, when the device is vulcanized, causes the tread 16 to more securely adhere to the tire. The filler 17 does not extend quite to the edges of the tread so that said edges are vulcanized directly to the rubber layer 14. By this construction the fabric is entirely protected from moisture.

Should the tube in the outer cell 4 become punctured, the tubes in the inner cells 5 and 6 will prevent collapsing of the tire and injury to the tire or rim. Should either of the tubes in the inner cells become injured the other tubes will, in a great measure, support the weight of the vehicle, but to prevent undue distortion of the tire in such event, I provide the tire with reinforcing rings 18, 19 and 20 which are formed of hard or car-spring rubber and embedded in the body 1 between the cells and between the slots and also between the inner cells and the base 12.

In Fig. 2 I have illustrated my invention embodied in a core adapted to be placed within the outer tube of a tire to take the place of the ordinary inner tube. In this form of my invention the core 1ª is formed substantially the same as the body 1 of the tire above described except that it is circular in cross section and the covering 14 and tread 16 are omitted, as well as the rim engaging base 12, otherwise the construction is the same.

Having described my invention what I claim as new and desire to secure by Letters Patent is:—

In a tire, a body provided with three circumferential cells, two of said cells being arranged side by side adjacent the base of said body and the third cell being arranged centrally of the body and adjacent the periphery, said body being also provided with slots communicating with said cells, and circumferential rings reinforcing said body and located between the outer cell and the two inner cells, between the inner cells and the base of the body and between said slots respectively, substantially as described.

In testimony whereof I have signed my name to this specification in the presence of two subscribing witnesses.

MARTIN L. KEAGY.

Witnesses:
CHAS. H. LIND,
JOS. A. PIERO.